United States Patent [19]

Lawson

[11] 4,035,320
[45] July 12, 1977

[54] RADIATION CURABLE COMPOSITIONS

[75] Inventor: Nelson E. Lawson, Trenton, N.J.

[73] Assignee: Union Camp Corporation, Wayne, N.J.

[21] Appl. No.: 604,488

[22] Filed: Aug. 14, 1975

Related U.S. Application Data

[63] Continuation-in-part of Ser. No. 434,440, Jan. 18, 1974, abandoned, which is a continuation-in-part of Ser. No. 274,409, July 24, 1972, abandoned.

[51] Int. Cl.$^2$ .................... C09D 3/66; C09D 3/81; C09D 11/10
[52] U.S. Cl. .................... 260/22 CB; 204/159.19; 204/159.23; 260/22 D; 260/23 AR; 260/27 R; 260/861; 260/873; 260/DIG. 38; 427/54
[58] Field of Search ........ 260/22 CB, 23 AR, 27 R, 260/861, 873, 22 D, 23 P

[56] References Cited

U.S. PATENT DOCUMENTS

| | | | |
|---|---|---|---|
| 1,799,420 | 4/1931 | Holton | 260/22 D |
| 2,813,841 | 11/1957 | Parker et al. | 260/22 D |
| 2,973,331 | 2/1961 | Kraft | 260/22 D |
| 3,124,550 | 3/1964 | Salgado et al. | 260/22 D |
| 3,230,162 | 1/1966 | Gilchrist | 260/22 D |
| 3,255,134 | 6/1966 | Rowe | 260/22 A |
| 3,258,438 | 6/1966 | Shaw et al. | 260/22 D |
| 3,335,102 | 8/1967 | Bussell et al. | 260/22 CB |
| 3,741,923 | 6/1973 | Fritsche et al. | 260/23 AR |
| 3,890,259 | 6/1975 | Montesissa et al. | 260/23 H |

*Primary Examiner* — Ronald W. Griffin
*Attorney, Agent, or Firm* — Kane, Dalsimer, Kane, Sullivan and Kurucz

[57] ABSTRACT

Disclosure is made of radiation curable, solventless compositions useful in coatings, films and in preparing printing inks. The compositions comprise the reaction product of an equivalent excess of an acrylic type acid with a particular class of polyester polyol. The polyester polyol is the condensation product of an excess of an aliphatic polyol having at least two hydroxyl groups and a molecular weight of from 60 to 250 with a specific class of aliphatic polycarboxylic acids derived from fatty and resin acids.

7 Claims, No Drawings

RADIATION CURABLE COMPOSITIONS

CROSS REFERENCE TO RELATED APPLICATIONS

This application is a continuation-in-part of copending U.S. application Ser. No. 434,440 filed Jan. 18, 1974, now abandoned, which is in turn a continuation-in-part of copending U.S. application Ser. No. 274,409 filed July 24, 1972, now abandoned.

BACKGROUND OF THE INVENTION

1. Field of the Invention

The invention relates to radiation curable acrylic resin compositions and more particularly relates to ultraviolet curable polyacryl polyester coating compositions including flexible printing ink compositions and intermediate compositions thereafter.

2. Brief Description of the Prior Art

In the prior art, most coating compositions, particularly of resinous materials were applied from a solvent solution, particularly organic solvents. The methods of application included brushing or spraying of a solvent solution, or dipping of the article into the coating solution. In each case a problem arose in that some means was generally necessary for reclaiming or disposing of the solvent which remained after or was stripped during the coating operation. The means generally involved substantial capital expenditures and added operating expense.

The problem of recovering solvents is particularly significant in printing operations. Many printing inks, such as those used for lithography, have heretofore been based on organic solvents. Following application of the solvated ink to the paper, the ink is set by heating which causes the evaporation of the organic solvent used to carry the ink base to the paper, sometimes with a concomitant cross-linking of the applied organic resinous material. If expensive solvent recovery equipment is not employed, then the solvent is evaporated to the air, adding to air pollution. With the radiation curable ink and coating vehicles of the present invention, no solvents are required and potential air pollution problems are obviated.

Solventless coating materials have been previously described; see for example, U.S. Pat. Nos. 3,551,235; 3,551,246; 3,551,311; and 3,616,364. Radiation curable ink and coating vehicles are generally liquid monomers or solutions of prepolymers dissolved in monomers, all of which copolymerize and solidify quickly when exposed to high energy radiation. In particular, the types of radiation employed are ultraviolet light and electron beam radiation. In addition to avoiding atmospheric pollution associated with solvent evaporation, radiation curing of ink and coating compositions requires little or no heat application. Thus, heat sensitive substrates, such as paper, plastics and wood, may be coated. Because of the speed of cure of a properly formulated radiation curable material, faster curing speeds may also be obtained, resulting in reduced operating costs. In addition, as cure only takes place where radiation has contacted the coating vehicle, clean-up problems are reduced as the unexposed, un-cross-linked material may easily be removed from the remainder of the equipment or material being coated.

While some of the prior art radiation curing systems provided adequately rapid cure, they did not provide film flexibility which is required for many uses, particularly printing inks. The cured coatings of the present invention are highly flexible and therefore particularly useful in printing. In addition, the prior art materials provided a significant problem when employed in printing applications. In the printing operation there is a significant amount of paper waste. This comes from trimmed ends, misprints, etc. In order to operate economically, and to generally avoid waste of natural resources, it is necessary to recover and recycle this paper. In recovery, the paper is usually subjected to caustic treatment as in an original paper making process. The de-inking treatment must remove the ink which has been applied in order to produce an acceptable grade of paper in the recycling operation. The majority of prior art solventless, radiation cured coatings cannot be removed by this basic treatment, thus reducing the economics and desirability of their use. The cured coatings prepared from the compositions of this invention are readily removed from paper by caustic treatments.

Prior to this invention, acrylates of castor oil were disclosed in U.S. Pat. No. 3,010.925. These acrylates are curable by radiation but only extremely slowly.

SUMMARY OF THE INVENTION

The invention comprises a radiation curable coating composition, which comprises;
the reaction product of,
a. an equivalent excess of an acrylic compound of the formula:

wherein
R is selected from hydrogen and methyl;
R' is selected from hydrogen, methyl and ethyl; and
b. a polyester polyol obtained by the condensation of
i. an aliphatic polycarboxylic acid having a molecular weight of at least about 325 and having at least 19 carbon atoms, inclusive; with
ii. an equivalent excess of an aliphatic polyol having at least two hydroxyl groups and a molecular weight of between about 60 to about 250.

The term "radiation curable coating composition" as used herein means a liquid monomer or prepolymer composition which is curable upon exposure to actinic and/or ionizing radiation. The term "curable" is used herein in its conventional sense as meaning capable of forming cross-links so as to form films.

The term "radiation" is used herein to include actinic radiation such as ultraviolet radiation and ionizing radiation created by the emission of electrons or highly accelerated nuclear particles such as neutrons, alpha-particles etc.

The compositions of the invention are useful in admixture with a photoinitiator as ultraviolet light curable solventless ink components and as radiation curable coatings, useful for example to produce relief plates for letterpress and/or letterset printing and for photo-resist systems.

DETAILED DESCRIPTION OF THE INVENTION

The compositions of the invention are polyacrylates obtained upon reaction of an equivalent excess of acrylic acid or methacrylic acid with a particular class of polyester polyols. The term "polyacrylates" is used herein to mean monomeric compounds or short chain oligomers having a plurality of acrylate and/or methacrylate groups. The term "equivalent excess" is sued herein to mean an excess proportion, on an equivalent basis, over that theoretically required to react with all of the hydroxyl groups present in the polyester polyol. Preferably at least a 10 percent equivalent excess of the acrylic acid (I) is employed.

The preparation of the polyacrylate is carried out by heating the polyester polyol with the acrylic acid (I), usually in the presence of a catalytic amount of a strong acid catalyst, such as sulfuric, p-toluenesulfonic, or methanesulfonic acids. A catalytic amount is generally in the range of about 0.01% to 5.0% by weight based on the weight of the reactants, but in some cases the strong acid may be omitted.

Preferably the polyacrylate is formed under a non-oxidizing atmosphere. This may be accomplished by conventional techniques such as by employing apparatus and methods for reaction under an inert gas atmosphere such as nitrogen gas. The reaction is generally carried out at a temperature between 80° and 130° C., at the boiling point of the reaction mixture. Since an organic co-solvent such as benzene, toluene, xylene, ethylenedichloride, cyclohexane heptane, etc., is desirably added in order to remove the water of esterification by azeotropic distillation, the boiling point of the reaction mixture depends on the selection of which solvent is employed. In preparing the polyacrylate, a polymerization inhibitor must be added to the reaction mixture to keep it from gelling. Examples of polymerization inhibitors are hydroquinone, 4-tert-butylcatechol, 2,6-tert-butyl-p-cresol, and the like. It is also desirable that the acrylic acid be added to the reaction mixture slowly over a period of time rather than all at once in the beginning, to prevent unwanted polymerization. The proportion of polymerization inhibitor used is generally within the range of from 0.1 to 2.0 percent by weight of the polyol ester.

It is also possible, as illustrated in the examples, to prepare the polyacrylates by a transesterification procedure. Here methyl or ethyl acrylate is used in excess both as a reactant and to dissolve the polyol ester. A catalyst such as sodium methoxide in an amount of from 0.01 to 1.0% by weight of the rectants may be used advantageously to promote the transesterification. The by-product methanol or ethanol is removed by absorption into molecular sieves which are added to the reaction mixture. The reaction is generally rapid enough under these conditions so that it may be carried out at room temperature (about 25° C.).

Time required for completion of the reaction forming the polyacrylate compositions of the invention will vary dependng upon the reactants and the temperatures employed. Completion of the reaction may be determined by monitoring the reaction mixture with infrared analysis to observe the disappearance of the hydroxyl absorption for the polyol reactant. Upon completion of the reaction, the desired polyacrylate compositions are conveniently separated from the reaction mixture by conventional methods such as, for example, by extraction in solvent, washing, stripping of solvent by distillation and like techniques.

In a preferred embodiment of the invention the final polyacrylate product obtained as described above is heated in the presence of the anhydride of a monobasic carboxylic acid having 2 to 6 carbon atoms, inclusive. In this embodiment, any unreacted hydroxyl groups are "capped". The resulting capped compositions are hydrophobic in nature and are particularly valuable in the formulation of lithographic printing ink compositions. Illustrative of the anhydrides employed are acetic, propionic, n-butyric, n-valeric, isobutylacetic anhydrides and the like. Heating is carried out at reflux temperatures for the reaction mixtures and the proportion of anhydride should be in considerable excess of that theoretically required to react with the residual hydroxyl functionality present by analysis. A convenient proportion is 10 ml of anhydride per 100 grams of material being capped.

The polyester polyols employed as reactants to prepare the polyacrylate compositions of the invention are a particular class of compounds prepared by reacting an equivalent excess of a particular class of aliphatic polyols with a specific group of aliphatic polycarboxylic acids. The term "equivalent excess" is used here to mean that the proportion of polyol employed is such that substantially all acid groups of the polycarboxylic acid are theoretically reacted, leaving terminal hydroxyl groups. In general, the polyol is employed in a proportion of at least enough to prevent the reaction mixture from gelling. The proportion will depend upon the functionality of the polyol and the polycarboxylic acid. For example, when the polyol is a triol and the polycarboxylic acid is a diacid, more than about 2 equivalents of hydroxyl per equivalent of acid are required to prevent the mixture from gelling. For the reaction of a triacid with a triol, 4 equivalents of hydroxyl per equivalent of acid is the minimum. There is no theoretical upper limit to the proportion of polyol which can be used; preferably about 4–5 times the minimum amount may be used. The exact proportion of polyol has a bearing on the physical properties of the radiation curable compositions of the invention. The greater the proportion of aliphatic polyol employed in preparing the polyester polyol, the greater will be the concentration of acrylate groups and the greater the amount of polyol acrylate from unreacted polyol in the final polyacrylate composition prepared according to the method of the invention. In turn, as the concentration of polyol acrylate increases, the viscosity and cure speed of the compositions of the invention decrease. Conversely, the polyacrylate composition with the highest viscosity (lowest polyol acrylate concentration) cures almost three times faster than the polyacrylate of lowest viscosity.

The polyols employed in the preparation of the polyester polyol are aliphatic polyols having at least two hydroxyl groups and a molecular weight of from about 60 to about 250. Illustrative of such polyols are diols such as ethylene glycol, propylene glycol, 1,4-butanediol, 1,5-pentanediol, neopentyl glycol, 1,6-hexanediol, 1,4-heptanediol, 1,2-octanediol, 1,9-nonanediol, 1,10-decanediol, 1,2-octadecanediol and the like; triols such as glycerol, trimethylolethane, trimethylolpropane, trimethylolbutane, 1,2,4-butanetriol, 1,2,5-pentanetriol, 1,2,6-hexanetriol and the like; tetrols such as erythritol, pentaerythritol and the like; pentoses such as ribose and the like; hexoses such as sorbitol and the like.

The aliphatic polycarboxylic acids employed to prepare the polyester polyol reactants used in preparing compositions of the invention are acylic, alicyclic and polycyclic aliphatic derivatives of fatty acids and rosin acids. They may be characterized as having at least two carboxyl groups, a molecular weight of at least about 325, preferably from about 325 to about 1130 and at least 19 carbon atoms, inclusive. The fatty and resin acids from which they are derived are those having from 3 to 22, preferably from 16 to 22 carbon atoms, inclusive. The preferred acids are illustrated by palmitic, margaric, stearic, n-nonadecylic, arachidic, n-heneicosoic, behenic, palmitoleic, petrosolinic, oleic, erucic, linoleic, abietic and like acids including mixtures thereof.

Illustrative of the aliphatic polycarboxylic acids described above are polymerized fatty acids such as dimer fatty acid, trimer and higher polymeric fatty acid and mixtures thereof, including crude mixtures as commercially available formed by polymerization of a fatty acid. Such polymeric polycarboxylic acids are well known as is their prepration; see for example U.S. Pat. Nos. 2,793,219 and 2,793,220. Because of their ready availability and relative ease of polymerization, oleic acid and linoleic acid are the preferred polymerized fatty acids. Mixtures of these two acids are generally found in tall oil fatty acids which are, accordingly, the common source for polymerization to polymerized fatty acids commercially available. Polymerized tall oil provides the preferred dimer and trimer fatty acids.

Polymerized resin acids such as polymerized abietic acid are also well known aliphatic polycarboxylic acids as is their preparation. Abietic acid is the principal component of rosin and so polymerized rosin (which is commercially available) may be advantageously employed without purification to prepare the polyester polyols. Polymerized rosin is the preferred form of polymerized resin acid used in this invention.

Further illustrative of aliphatic polycarboxylic acids are carboxylated fatty acids such as carboxystearic acid; see U.S. Pat. Nos. 3,270,035 and 2,831,877. Preferred carboxylated fatty acids are those having 19 carbon atoms (see U.S. Pat. No. 3,270,035).

Further illustrations of aliphatic polycarboxylic acids which may be used to prepare the polyester polyols used herein are the adducts obtained by Diels-Alder addition of maleic anhydride, fumaric or acrylic acid to a fatty or resin acid (rosin) having 16 to 22 carbon atoms, inclusive. Such polycarboxylic acids are well known as is the method of their preparation; see for example U.S. Pat. No. 3,753,968.

Of the above described polycarboxylic acids, the most preferred because they provide greater flexibility in the coatings, are the dimer fatty acids, trimer fatty acids, maleated fatty acids, and carboxystearic acid. The carboxystearic acids are further preferred since they provide especially improved adhesion.

The condensation of aliphatic polycarboxylic acid with aliphatic polyol is effected admixing the two reactants and heating the admixture. Heating may be carried out in the presence of a catalytic proportion of a condensation catalyst, however lighter colored products may be obtained if the condensation is carried out without the assistance of a catalyst. Representative of condensation catalysts whuich may be used are zinc acetate and preferably p-toluenesulfonic acid. The catalyst is employed in a catalytic proportion, which is generally within the range of from about 0.0001 to about 1.0 percent by weight of the starting reactants. The heating step may be carried out over a wide range of temperatures, i.e.; from about 150° C. to about 300° C. Preferably the heating step is carried out under an inert gaseous atmosphere such as a nitrogen gas atmosphere. During the reaction it is advantageous to remove the water of condensation as it forms. Thus, removal of water may be carried out by conventional techniques well known to those skilled in the art, for example by azeotropic distillation.

The time required to complete the condensation of polycarboxylic acid and aliphatic polyol varies depending on the nature of the reactants, catalyst and reaction temperature used. Progress of the reaction is observable by periodic analysis to determine the acid number of the reaction mixture.

Upon completion of the reaction, the desired polyester polyol may be separated from the reaction mixture by conventional techniques such as, for example, by extraction in solvent, washing and stripping of solvent. Generally the crude reaction mixture contains substantial proportions of excess aliphatic polyol reactant. According to a preferred embodiment of the invention, the excess polyol may be allowed to remain in admixture with the polyester polyol product and esterified, at the same time as esterification of the polyester-polyol product with the acrylic acid (I). The resulting product will, of course, be a mixture containing a polyol acrylate derivative of the aliphatic polyol in addition to the polyacrylate of the polyester polyol. Such mixtures are within the scope of the compositions of the invention and are in fact preferred.

The following examples and preparations describe the manner and process of making and using the invention and set forth the best mode contemplated by the inventor of carrying out the invention but are not to be construed as limiting. All parts are by weight unless otherwise specified.

Preparation 1

Trimer Fatty Acid — Trimethylolpropane Polyester Polyol

An appropriate reaction vessel is charged with 100 parts of trimer fatty acid (Empol 1041, having 2.879 milliequivalents of carboxyl per gram of acid), 190 parts of trimethylolpropane, and 1.8 parts of zinc acetate. The charge is heated under a nitrogen blanket while distilling the water produced by the esterification. After refluxing for 2 hours, the acid number drops to 0.55 and the product is cooled, dissolved in chloroform, and transferred to a separatory vessel where it is diluted with ether and washed five times with water and onve with a saturated salt solution. The washed solution is dried over Drierite and filtered. Solvent is then removed under vacuum to yield 120.4 parts of trimer acid-trimethylolpropane polyester polyol. The product has a hydroxyl concentration of 3.96 milliequivalents per gram (92% of theoretical), an acid number of 0.72, a Gardner color of 10−, and a Gardner-Holt viscosity of Z-7+.

Preparation 2

Trimer Fatty Acid-Glycerol Polyester Polyol

Onw hundred parts of trimer fatty acid containing 0.288 equivalents of carboxylic acid functionality, 133 parts of glycerol, and 1.8 parts of zinc acetate are heated together at 200° C. for 10 hours following the same general procedure of Preparation 1. When the acid number drops to 1.1 the product is worked up as described in Preparation 1, except that a preliminary drying is conducted over anhydrous potassium carbonate. The polyester polyol product has an acid number of 0.3, a hydroxyl concentration of 2.76 milliequivalents per gram, a Gardner color of 10−, and a Gardner-Holt viscosity of greater than Z-10.

Preparation 3

Trimer Fatty Acid-neopentyl Glycol Polyester Polyol

Following the procedure of Preparation 2, supra., 100 parts of trimer fatty acid and 150 parts of neopentyl glycol are reacted to obtain the corresponding polyester polyol product. The product has an acid number of 0.5, a hydroxyl concentration of 2.32 milliequivalents per gram (100% of theoretical), a Gardner color of 10+ and a Gardner-Holt viscosity of Z-5.

Preparation 4

Trimer Fatty Acid — Pentaerythritol-TMP Polyester Polyol

Pentaerythritol with a melting point of 200° C. is mixed with trimethylolpropane in a weight ratio of 2:1 to provide a polyol mixture with a melting point of about 190° C. 195 parts of the mixture is reacted with 100 parts of trimer fatty acid employing the procedure of Preparation 1. The polyester polyol product has an acid number of 0.7, a hydroxyl concentration of 3.68 milliequivalents per gram, a Gardner color of 10+, and a Gardner-Holt viscosity of greater than Z-10.

Preparation 5

Dimer Fatty Acid-Trimethylolpropane Polyester Polyol

An appropriate vessel is charged with 600 parts of a dimer fatty acid (having 3.44 milliequivalents of carboxylic acid per gram of acid), 552 parts of trimethylolpropane, and 13.5 parts of zinc acetate. The charge is heated at 190° C., under a nitrogen blanket, while collecting the water produced by esterification in a Dean-Stark trap. After heating for four hours, the acid number drops to 0.40. The polyester polyol product is then allowed to cool to about 120° C. and 600 parts of toluene is added with mixing.

Preparation 6

Fumarated Rosin-Trimethylolpropane Polyester Polyol

An appropriate vessel is charged with 250 parts of fumarated rosin, (Uni-Rez 710, Union Camp Corp.; 5,34 milliequivalents of carboxyl group per gram of rosin acid), 239 parts of trimethylolpropane and 8.8 parts of zinc acetate. The charge is heated at 200° C. under a nitrogen blanket while collecting the water produced by esterification in a Dean-Stark trap. After heating the reaction mixture for four hours, the acid number drops to 23.0. The reaction mixture is then poured into aluminum dishes and solidified upon cooling to yield 469 parts of a fumarated rosintrimethylolpropane polyester polyol product. The product has a hydroxyl concentration of 7.64 milliequivalents per gram and an acid number of 25.2.

Preparation 7

Dimer Fatty Acid-Pentaerythritol Polyester Polyol

A mixture of 53 parts of pentaerythritol and 1.8 parts of zinc acetate are melted at 260° C. under a nitrogen gas blanket. To the molten material there is added, with stirring, 75 parts of dimer fatty acid having 3.45 milliequivalents of carboxyl group per gram of acid. The water produced by esterification is collected in a Dean-Stark trap. At the end of the acid addition, the temperature drops to 200° C. The temperature is then raised to 240° C. over a one hour period after which the acid number drops to 2.1, and the mixture is allowed to cool. The product, 97 parts of dimer fatty acid-pentaerythritol polyester polyol product is obtained as a semi-solid material having a hydroxyl concentration of 5.85 milliequivalents per gram and an acid concentration of 1.68 milliequivalents per gram.

Preparation 8

Dimer Fatty Acid — Trimethylolpropane Polyester Polyol

Dimer fatty acid (1200 g, 4.13 eq $CO_2H$), trimethylolpropane (1044 g, 23.41 eq OH), and p-toluenesulfonic acid (1.24 g) are heated together at 190° C. while being continually sparged with nitrogen. The water produced by esterification is condensed and separated (65 ml). After heating for 3.75 hours, the acid number drops to 1. The resulting mixture (2223 gms) is a crude mixture containing dimer fatty acid-trimethylolpropane polyester polyol.

Preparation 9

Acrylic Acid Adduct of Rosin - Trimethylolpropane Polyester Polyol

The acrylic acid adduct of rosin [Halbrook, et al., J. Org. Chem., 29 1017 (1964)] (500 g), trimethylolpropane (715 g), and p-toluenesulfonic acid (2.5 g, 0.5% acid) are heated together at 220° C. while continually sparging with nitrogen. The water is condensed and separated. The reaction mixture is heated about 4 hours or until the acid number is about 20. The product polyol may be used "as is" for preparation of the polyacrylate.

Preparation 10

Acrylic Acid Adduct of Fatty Acid — Trimethylolpropane Polyester Polyol

The $C_{21}$ adduct of acrylic acid and linoleic acid (U.S. Pat. 3,753,968) (500 g), trimethylolpropane (760 g), and p-toluenesulfonic acid (2.5 g, 0.5% acid) are heated together at 200° C. while continually sparging with nitrogen. The water is codensed and separated. The reaction mixture is heated about 4 hours or until the acid number is about 15. The product polyester is used "as is" for preparation of the polyacrylate.

Preparation 11

Carboxystearic Acid — Trimethylolpropane Polyester Polyol

Carboxystearic acid (U.S. Pat. 3,270,035) (500 g, 2.7 eq of $CO_2H$), trimethylolpropane (722 g, 6 eq OH/eq $CO_2H$), and p-toluenesulfonic acid (2.5 g, 0.5% acid) are heated together at 270° C. while continually sparging with nitrogen. The water of condensation is separated. The reaction mixture is heated about 4 hours or until the acid number is about 11. The product polyester may be used "as is" for preparation of the polyacrylate.

Preparation 12

Dimerized Rosin — Trimethylolpropane Polyester Polyol

Dimerized rosin (Dymerex, Hercules Incorporated) (500 g, 1.3 equivalents of $CO_2H$), trimethylolpropane (348 g, 6 equivalents OH/equivalent $CO_2H$), and p-toluenesulfonic acid (2.5 g, 0.5% acid) are heated together at 280° C. while continually sparging with nitrogen. The water of condensation is condensed and separated. The reaction mixture is heated about four hours, or until the acid number is about 20.

Preparation 13

Fumarated Rosin-Trimethylolpropane Pollyester Polyol

Fumarated rosin (Uni-Rez 710) (500 g, 2.67 equivalents $CO_2H$), trimethylolpropane (954 g, 8 equivalents OH/equivalent $CO_2H$), and p-toluenesulfonic acid (2.5 g 0.5% acid) are heated together at 185° C. while being cntinually sparged with nigrogen. The water produced by esterification (67 ml) is collected in a Dean-Stark trap. After heating for four hours the acid number drops to 21. There is 1356 g of polyester isolated.

Preparation 14

Maleated Rosin — Trimethylolpropane Polyester Polyol

Repeating the procedure of Preparation 13, supra. but replacing the fumarated rosin with an equal proportion of a maleated resin, a maleated rosin-trimethylolpropane polyester polyol is obtained.

Preparation 15 maleated Fatty Acid

Tall oil fatty acids consisting of about 48% oleic and 37% linoleic acids (Unitol ACD) (800 g, 2.82 equivalents $CO_2H$), maleic anhydride (276.5 g, 2.82 moles anhydride), and triphenylphosphite (4.0 g, 0.5% fatty acid) are placed in a three-liter resin kettle equipped with a nitrogen sparge, condenser, and a mechanical stirrer. The reaction mixture is heated at 186°–190° C. for 4.5 hours while being continually sparged with nitrogen.

Preparation 16

Maleated Fatty Acid — Trimethylolpropane Polyester Polyol

The maleated fatty acid of Preparation 15, supra. (1046.6 g), trimethylolpropane (1004.7 g, 22.5 equivalents OH), and p-toluenesulfonic acid (10.5 g, 1% of acid) are placed in a three-liter resin kettle equipped with a Dean-Stark trap and condenser, nitrogen sparge, and mechanical stirrer. The reactants are heated slowly to 190° over a 1.8 hour period, with nitrogen sparge, until water evolution (88 ml) ceases. The acid number is 15.2. The product (1934.6 g) is a maleated fatty acid-trimethylolpropane polyester polyol.

EXAMPLE 1

A quantity of 72.5 parts of the polyester polyol produced according to Preparation 1, supra., is dissolved in 250 parts of methyl acrylate. To the mixture there is added 92 parts of dried Linde 4A molecular sieves and 0.17 parts of sodium methoxide. The mixture is reacted at 25° C. for 10 minutes under a nitrogen blanket while agitating the reaction mixture. The sieves are then filtered from the reaction mixture, the filtrate diluted with ether, washed three times with water and once with a saturated salt solution. The solvent is evaporated from the washed ether solution under vacuum after addition of 0.09 parts of t-butylcatechol. The polyacrylate so obtained has an acrylate concentration of 2.15 milliequivalents per gram (66% of theory). The product has an acid number of 0.76, a hydroxyl concentration of 0.85, a Gardner color of 8–, and a Gardner-Holt viscosity of Z.

EXAMPLE 2

The polyester polyol product of Preparation 2, supra., is converted to the polyacrylate by stirring at 25° C. under a nitrogen blanket, a solution of 5 parts of the product of Preparation 2, in 18 parts of methyl acrylate with 7 parts of dried Linde 4A molecular sieves and 0.01 parts of sodium methoxide. After two hours, conversion to the acrylate is nearly complete as evidenced by the infrared spectrum which shows no absorption due to hydroxyl groups. The product is separated from the reaction mixture following the procedure of Example 1.

EXAMPLE 3

The polyester polyol product of Preparation 3, supra., is converted to the corresponding polyacrylate following the procedure of Example 2. Infrared analysis shows that the reaction is completed in 10 minutes. The polyacrylate product has an acrylate concentration of 0.54 milliequivalents per gram, (75% of theory).

EXAMPLE 4

The polyester polyol product of Preparation 4 is converted to the polyacrylate following the procedure of Example 2, supra. Infrared analysis indicates that the conversion is complete in 80 minutes.

EXAMPLE 5

To the solvent mixture of polyester polyol product obtained in Preparation 5, supra. there is added 1,980 parts of glacial acrylic acid, 6.1 parts of hydroquinone, and 55 parts of p-toluenesulfonic acid. The resulting mixture is heated at reflux, (112° to 135° C.), for five hours under a nitrogen blanket while collecting the water produced from the esterification in a Dean-Stark trap. At the end of this period, must of the toluene and acrylic acid is removed by evaporation under reduced pressure. The residue is diluted with toluene and the remaining acrylic acid neutralized with saturated sodium bicarbonate solution. The resulting mixture is washed with saturated sodium chloride solution and dried over anhydrous calcium sulfate. Solvent is stripped from the dry solution under reduced pressure at 45° C. to yield the desired polyacrylate product. The product has an acrylate concentration of 5.35 milliequivalents per gram, a Gardner color of 10, and a Gardner-Holt viscosity of U.

EXAMPLE 6

A quantity of 200 parts of the product of Preparation 6, supra and 700 parts of toluene are mixed and heated at 110° C. for one hour under a nitrogen blanket. To the resulting solution there is added one part of 4-t-butylpyrocatechol, 356 parts of glacial acrylic acid, and ten parts of p-toluenesulfonic acid. The resulting mixture is heated at reflux for 6.6 hours while collecting the water produced from the esterification in a Dean-Stark trap. Following the period of heating at reflux, the reaction mixture is cooled and washed five times with water and then by a wash with sufficient saturated sodium bicarbonate solution to neturalize the excess acrylic acid and finally with a saturated sodium chloride solution. The washed material is then dried over anhydrous calcium sulfate and the solvent stripped from under reduced pressure at 45° C. to yield 226 parts of the desired polyacrylate product. The product has an acrylate concentration of 4.08 milliequivalents per gram, a Gardner color of 10, and a Gardner-Holt viscosity of Z-6.

EXAMPLE 7

A quantity of 85 parts of the product of Preparation 7, supra, and 430 parts of toluene are heated at 110° C. for one hour under a nitrogen blanket in order to form a solution. To the solution there is added 0.45 part 4-t-butylpyrocatechol, 125 parts of glacial acrylic acid, and 4.2 parts of p-toluenesulfonic acid. The mixture is heated, at reflux, for 6.5 hours while collecting the water produced by esterification in a Dean-Stark trap. Following the 6.5 hour period of heating, the reaction mixture is cooled and filtered. The filtrate is washed five times with water and then with sufficient saturated sodium bicarbonate solution to neturalize the excess acrylic acid. The resulting mixture is then washed with saturated sodium chloride solution and dried over anhydrous calcium sulfate. Solvent is stripped from the resulting solution under reduced pressure at 45° C. to yield the desired dimer fatty acid-pentaerythritol polyacrylate product. The product has a Gardner color of 15+, a Garnder-Holt viscosity of Z-6, and an acrylate concentration of 3.14 milliequivalents per gram.

Similarly, following the above procedure but replacing the glacial acrylic acid with an equal proportion of methacrylic, the corresponding polymethacrylate composition is obtained.

EXAMPLE 8

The polyester polyol of Preparation 8, supra, (50 g; 0.42 eq OH), cyclohexane (75 ml), p-toluenesulfonic acid (3.0 g, 6% polyol ester) and hydroquinone (0.2 g, 0.4% polyol ester) are placed in a 250 ml, round-bottom flask equipped with a nitrogen inlet tube, condenser with Dean-Stark trap, thermometer, addition funnel, and magnetic stirrer. The mixture is mixed and heated to reflux (90°–91° C.) under nitrogen gas. Acrylic acid (38 ml, 0.56 eq $CO_2H$) is added slowly over a 1-hour period. The mixture is then heated for 2.5 hours; water evolution is very slow by this time. The apparatus is then set for total reflux and 2,6-di-t-butyl-p-cresol (0.2 g) and acetic anhydride (5 ml; 10 w/v % polyol ester) are added to the mixture. Heating is continued for two additional hours. The reaction mixture is then neutralized with 273 ml of saturated sodium bicarbonate and 136 ml of saturated sodium chloride solution. The netural organic phase is dried over anhydrous calcium sulfate and filtered (using filter aid). To the filtrate is added 0.2 g hydroquinone and the solvent is removed under reduced pressure at 45° C. to yield 53.5 g of polyacrylate. Its properties are shown below:

| Acrylate Conc. (meq/g) | 3.88 |
| Viscosity (Gardner) | W |
| Color (Gardner) | 9 |

EXAMPLE 9

To a solution of the polyester polyol of Preparation 9 supra., (600 g) in 900 ml of 1,2-dichloroethane there is added hydroquinone (2.5 g, 0.42% polyol ester) and p-toluenesulfonic and (36.0 g, 6% polyol ester). The mixture is charged to an apparatus identical to that described in Example 8. The mixture is heated to reflux under nitrogen gas and glacial acrylic acid (616 g, 8.6 eq acid) is added over a one-half hour period. The mixture is then heated at reflux for about 4 hours or until water evolution is essentially complete. The apparatus is then set for total reflux and 2,6-di-t-butyl-p-cresol (2.5 g) and acetic anhydride (10 w/v % polyol ester) are added to the reaction mixture and heating is continued for two additional hours. The reaction product is then worked up following the procedure of Example 8, supra. to obtain the desired polyacrylate composition.

EXAMPLE 10

To a solution of the polyester polyol of Preparation 10, supra., (600 g) in 900 ml of cyclohexane there is added hydroquinone (2.5 g, 0.42% polyol ester) and p-toluenesulfonic acid (36.0 g, 5$ polyol ester). The mixture is charged to apparatus identical to that used in Example 8, supra. The mixture is heated to reflux under nitrogen gas and glacial acrylic acid (634 g, 8.8 eq acid) is added over a one-half hour period. The mixture is heated at reflux for about 4 hours or until the water evolution is essentially complete. The apparatus is then set for total reflux and 2,6-di-t-butyl-p-cresol (2.5 g) and acetic anhydride (10 w/v % polyol ester) are added to the reaction mixture and heating is continued for two additional hours. The reaction product is worked up following the procedure of Example 8, supra., to obtain the desired polyacrylate composition.

EXAMPLE 11

To a solution of the polyester polyol of Preparation 11, supra, (600 g) in 900 ml of cyclohexane there is added hydroquinone (2.5 g, 0.42% of polyol ester). The mixture is charged to the apparatus described in Example 8. The mixture is heated to reflux under nitrogen gas and glacial acrylic acid (621 g, 8.6 eq acid) is added over a one-half hour period. The mixture is then heated at reflux for about 4 hours or until the water evolution is essentially complete. The apparatus is then set for total reflux and 2,6-di-t-butyl-p-cresol (2.5 g) and acetic anhydride (10 w/v % polyol ester) are added to the reaction mixture and heating is continued for two additional hours. The reaction product is worked up following the procedure described in Example 8, supra., to obtain the desired carboxystearic acid-trimethylolpropane polyacrylate.

EXAMPLE 12

To a solution of the polyester polyol of Preparation 12, supra., (800 g) in 1200 ml 1,2-dichloroethane is added hydroquinone (3.4 g, 0.43% of polyol ester) and p-toluenesulfonic acid (48.0 g, 6% of polyol ester). The mixture is charged to a round bottom flask equipped with a nitrogen inlet tube, water trap with condenser, thermometer, addition funnel and mechanical stirrer. The mixture is heated to reflux under nitrogen gas and glacial acrylic acid (569 g, 7.2 eq acid) is added over a one-half hour period. The mixture is heated at reflux for about 4 hours on until the water evolution is essentially complete. The water trap is removed and the apparatus is then set for total reflux and 2,6-di-t-butyl-p-cresol (3.4 g) and acetic anhydride (10 w/v % polyol ester) are added to the mixture. Heating is continued for two additional hours and then the mixture is allowed to cool to room temperature. When cool, the organic phase is neutralized with a mixture of 2:1 saturated sodium bicarbonate solution and saturated sodium chloride solution (using no more than necessary to neutralize the acids present). The organic phase is dried over anhydrous calcium sulfate, filtered (using filter aid) and 3.4 g of hydroquinone is added. The solvent is removed under pressure at 45° C. to produce the desired polyacrylate.

EXAMPLE 13

To a solution of the polyester polyol of Preparation 13, supra., (1352.9 g) in 2028 ml 1,2-dichloroethane there is added hydroquinone (5.4 g, 0.43% of polyol ester), glacial acrylic acid (1636.7 g, 22.7 eq acid), and p-toluenesulfonic acid (81.0 g, 6% of polyol ester). The mixture is charged to apparatus similar to that described in Example 15, infra. The mixture is heated at reflux temperature (87°–97° C.) under a nitrogen gas blanket for seven hours while collecting the water produced by esterification (259 ml) in a Dean-Stark trap. At this time 2,6-di-t-butyl-p-cresol (5.4 g) and acetic anhydride (270 ml) are added to the reaction mixture after the apparatus is set up for total reflux; the heating is continued for 2 additional hours and the mixture then allowed to cool to room temperature. When cool, the organic phase is neutralized with a mixture of 12.8 liters of saturated sodium bicarbonate solution and 6.4 liters of saturated sodium chloride solution. The emulsions formed during this step are broken up addition of drying agent; the combined organic phases are dried over anhydrous calcium sulfate, filtered (using filter aid), and 5.4 g hydroquinone added. Solvent is removed under reduced pressure at 45° C. to yield 1973.7 g of the desired polyacrylate. The product properties are given below:

| | |
|---|---|
| Acrylate Conc. (meq/g) | 5.59 |
| Gardner Viscosity | W |
| Gardner Color | 11 |

EXAMPLE 14

Following the procedure of Example 13, supra., but replacing the polyester polyol of Preparation 13, supra., as used therein with the polyester polyol of Preparation 14, supra., the corresponding polyacrylate is obtained.

EXAMPLE 15

Maleated fatty acid-trimethylolpropane polyester polyol prepared in Example 16, infra., (1300.5 g), p-toluenesulfonic acid (78 g, 6% polyol ester), hydroquinone (5.2 g, 0.4% polyol ester), and cyclohexane (1951 ml) are added to a twelve-liter, round-bottom flask equipped with a nitrogen inlet tube, Dean-Stark trap with condenser, thermometer, addition funnel and mechanical stirrer. The mixture is heated to reflux (80°–83° C.) under nitrogen gas and acrylic acid (958.4 g, 13.3 eq acid) is added slowly over a one-half hour period. The mixture is then heated for 4.3 hours; water evolution (168 ml) is very slow at this time. The apparatus is set for total reflux and 2,6-di-t-butyl-p-cresol (5.2 g) and acetic anhydride (10 w/v % polyol ester) are added to the mixture. Heating is continued for two additional hours. At the end of this period the mixture is allowed to cool to room temperature. The organic phase is neutralized with 4642 ml of saturated sodium bicarbonate and 2321 ml of saturated sodium chloride solution; there is a small amount of emulsion formed. The organic phase and emulsion are separately dried over anhydrous calcium sulfate, filted (using filter aid) and combined. To the combined filtrate is added 5.2 g hydroquinone. Solvent is removed under reduced pressure at 45° C. to yield 1592.2 g of maleated fatty acid-trimethylolpropane polyacrylate. The properties are shown below:

| | |
|---|---|
| Acrylate Conc. (meq/g) | 4.15 |
| Gardner Viscosity | Z-1 |
| Gardner Color | 10 |

In general, the compositions of the invention described above, per se, may be cured by exposure to actinic or ionizing radiation. When the source of radiation is ultraviolet light, which is a preferred method of the invention, a sensitizer or photoinitiator is preferably included in the composition. Any of the conventional sensitizers may be used, such as benzophenone and its derivatives, mixtures of benzophenone with amines such as triethanolamine, benzoin and its derivatives, halohydrocarbons, alpha-bromoacetophenone, bromoisobutyrophenone, desylaryl sulfides, triphenylphosphine and the like, generally in amounts of from about 0.1 percent to 50 percent. The preferred amount of the photoinitiator is from about 0.5 percent to 20 preferred by weight of the composition. The term "halohydrocarbons" is used herein to mean a hydrocarbon wherein one or more hydrogen atoms have been replaced with halogen, i.e.; chlorine, bromine and the like.

Generally, it is also desirable to include a polymerization inhibitor in the solventless coating formulation to prevent premature polymerization of the monomeric or oligomeric materials which comprise the compositions of the invention. Among the inhibitors which may be employed are t-butylcatechol, hydroquinone or its monomethyl ether and the like. The amounts employed should be as little as possible and generally no more than about 0.2 percent to 0.5 percent to avoid reducing the cure rate significantly.

For use as a printing ink, the radiation curable vehicle and sensitizer are generally blended with a color pigment, such as carbon black, cyan blue, phthalo blue, diarylide yellow and the like. If desired, copolymerizable reactive materials and polymerization inhibitors may be included.

The following examples illustrate the use of the polyacrylate compositions of the invention. While the examples specifically show the use of the polyacrylates of the present invention without additives other than sensitizers and inhibitors, reactive cosolvents may be blended with the polyacrylate compositions before application. The curing of the polyacrylate compositions effects the incorporation of these reactive cosolvents. The materials which may be included as cosolvents include styrene, methyl or other alkyl methacrylates, divinylbenzene, methyl or other alkyl acrylates, and vinyl toluene. The amounts of cosolvent may vary from 5 to 60 percent, based upon the amounts of polyacrylate employed. Further, non-reactive polymers and pre-polymers may be added as fillers. Such non-reactive polymers include, for example, polyesters, aryl sulfonamideformaldehyde resins, epoxy resins and urea-formaldehyde resins. The effect of these additions is to improve the hardness, flexibility, heat resistance, rheology, adhesive or other physical properties of the cured or uncured coating or ink composition.

In general, curing according to the present invention has been shown as accomplished in an ambient atmosphere. However, the samples may be blanketed with nitrogen during cure effected by ultraviolet radiation. When a nitrogen blanketing is employed, cure speeds have been found to increase by as much as 40 to 50 percent

EXAMPLE 16

A portion of the polyacrylate produced in Example 6 is mixed with one percent of benzophenone and the mixture spread on 5 inches × 4 inches aluminum panels using an adjustable spreader of the Gardner drawdown knife type, to achieve a film thickness of 0.001 inch. The coated panels are passed under a 200 watt per linear inch Hanovia medium pressure mercury vapor lamp employing a variable speed conveyor. The maximum belt speed at which the sample cured in air to a tack-free surface is considered to be the cure speed of the resin. The resin described in Example 6, with the benzophenone photoinitiator present, is found to have a cure speed of 2.8 inches per second. Additional sample panels of the coating are prepared having film thicknesses of 0.0003 inch with the coating composition containing one percent and tan percent respectively, of benzophenone. Employing the same Hanovia lamp and variable speed conveyor described above the coating containing one percent benzophenone is found to have a cure speed of 3.7 inches per second, while that containing ten percent benzophenone is found to have a cure speed of 15.5 inches per second.

EXAMPLE 17

Employing a quantity of one percent of benzophenone mixed with the polyacrylate of Example 7, curing is carried out following the procedure set forth in Example 16. It is found that the polyacrylate is cured at speeds of 5.2 inches per second at a thickness of 0.001 inch. At thicknesses of 0.0003 inch, the polyacrylate of Example 7 cured at a speed of 7.8 inches per second with one percent benzophenone and at a speed of 17.3 inches per second with ten percent benzophenone added thereto.

EXAMPLE 18

The cure speeds, as defined previously, are determined for various polyacrylate-photoinitiator compositions according to the present invention. The polyacrylates employed are those produced, respectively, according to Examples 5, 6, 8, 13 and 15. These are indicated, as such, in Table I below. The photosensitizers employed, as indicated in the same table, are listed below:
  a. Benzophenone at a concentration of ten percent;
  b. A mixture of 60 percent triethanolamine, 35.6 percent benzophenone, and 4.4 percent 4,4'-bis(-dimethylamino) benzophenone at a level of ten percent;
  c. A chlorinated hydrocarbon containing 70 percent chlorine, similar to that shown in U.S. Pat. No. 3,551,311 in an amount of 50 percent; and
  d. A mixture of benzoin ethers sold under the name Vicure-10 by Stauffer Chemical Co. in an amount of ten percent.

The photoinitators referred to above are described in the table by the respective letters just given. The cure speed is given in inches per second with a 0.3 mil thick coating on an aluminum plate with dimensions of five inches by four inches. The ultraviolet radiation was supplied by a Hanovia mercury lamp with an output of 200 watts per linear inch and the film is considered to be cured when it will no longer "smudge" or is tack free.

TABLE I

| Acrylate of | Cure Speed (Inches Per Second at 0.3 Mil Thickness) | | | |
|---|---|---|---|---|
| Example | (a) | (b) | (c) | (d) |
| 5 | 3.1 | 14.7 | 0.9 | 2.3 |
| 6 | 9.5 | Greater than 48 | 3.6 | Greater than 48 |
| 8 | — | 26 | — | — |
| 13 | — | 24 | — | — |
| 15 | — | Greater than 50 | — | — |

It will be observed from the data in Table I that the cure speeds of the polyacrylate-photoinitiator compositions of the invention are particularly high. Special reference is made to the curing of the polyacrylate of Example 6 with photoinitiators (b) and (d).

Repeating the above procedure but replacing the polyacrylate compositions as used therein with any one of the polyacrylate compositions of Examples 1–4, inclusive, and 9–12, inclusive, the resulting polyacrylte-photoinitiator compositions are found to be curable by ultraviolet radiation.

EXAMPLE 19

The effect of pigmentation of the polyacrylate-photoinitiator compositions of the present invention is determined by this example. Inks are formulated employing as a first acrylate base 72 percent of the polyacrylate of Example 6 and 28 percent of the polyacrylate of Example 5. This is mixed with, in the first case, a 12 percent pigment loading of phthalo blue and, in a second case, with a 15 percent black pigment loading. A quantity of photoinitiator (b), as defined in Example 18, is added. A second series of inks is formulated employing only the polyacrylate of Example 5. The thus formulated inks are printed on coated paper board employing a Vandercook proof press and the cure speeds are determined at a film thickness of 0.6 mil, for the polyacrylate mixture of Examples 5 and 6, and at a thickness of 0.3 mil employing only the polyacrylate of Example 5. The inks are cured under a Hanovia mercury lamp with an output of 200 watts per linear inch and they are considered cured when the films are tack-free or will not "smudge". It will be seen from the results of Table II below that while cure speeds are somewhat diminished when the polyacrylate-photoinitiator compositions are pigmented, they are significant and commercially acceptable.

TABLE II

| Acrylate of | Cure Speed (Inches Per Second) | | |
|---|---|---|---|
| Example | Unpigmented | Blue Pigment | Black Pigment |
| 5 and 6 | Greater than 48 | 39.0 | 17.0 |
| 5 | 14.7 | 13.0 | 1.8 |

Similarly, repeating the above procedure but replacing the polyacrylates of Examples 5 and 6 as used therein with the polyacrylate compositions of Examples 1-4, inclusive and 7-15, inclusive, respectively, cured ink compositions are obtained.

What is claimed is:
1. The polyacrylate reaction product of,
   a. an equivalent excess of an acrylic compound of the formula:

wherein R is selected from hydrogen and methyl;
   R' is selected from hydrogen, methyl and ethyl; and
   b. a polyester polyol obtained by the condensation of
      i. an aliphatic polycarboxylic acid having a molecular weight of at least 325 and at least 19 carbon atoms, inclusive; with
      ii. an equivalent excess of an aliphatic polyol having at least two hydroxyl groups and a molecular weight of between about 60 to about 250; said reaction of (a) and (b) being under conditions wherein said acrylic compound does not polymerize.

2. The product of claim 1 wherein R is hydrogen.
3. The product of claim 1 wherein R is methyl.
4. The product of claim 1 wherein hydroxyl groups are capped by reaction with the anhydride of a monobasic carboxylic acid having from 2 to 6 carbon atoms, inclusive.
5. The product of claim 1 wherein said polycarboxylic acid is a polymerized fatty acid.
6. The product of claim 1 wherein said aliphatic polyol is trimethylolpropane.
7. The product of claim 1 wherein said aliphatic polyol is pentaerythritol.

* * * * *

UNITED STATES PATENT OFFICE
CERTIFICATE OF CORRECTION

Patent No. 4,035,320                     Dated July 12, 1977

Inventor(s) Nelson E. Lawson

It is certified that error appears in the above-identified patent and that said Letters Patent are hereby corrected as shown below:

At Column 1, line 18, - "thereafter" should read -- therefor --
At Column 3, line 2,  - "sued" should read -- used --
At Column 3, line 44, - "rectants" should read -- reactants --
At Column 5, line 58, - "whuich" should read -- which --
At Column 6, line 47, - "onve" should read -- once --
At Column 6, line 59, - "onw" should read -- one --
At Column 8, line 43, - "codensed" should read -- condensed --
At Column 9, line 13, - "cntinually" should read -- continually --
At Column 10, line 39, - "must" should read -- most --
At Column 11, line 66, - "and" should read -- acid --
At Column 13, line 11, - "(1352.9g)" should read -- (1351.9g) --
At Column 13, line 28, - "up" should read -- by --
At Column 14, line 27, - after "20" insert -- percent --
At Column 15, line 27, - "tan" should read -- ten --
At Column 16, line 28, - "polyacrylte" should read -- polyacrylate Signed and Sealed this Twenty-second Day of November 1977

[SEAL]

Attest:

RUTH C. MASON
Attesting Officer

LUTRELLE F. PARKER
Acting Commissioner of Patents and Trademarks